United States Patent
Draper et al.

(10) Patent No.: US 7,651,801 B2
(45) Date of Patent: Jan. 26, 2010

(54) CURRENT BUS AND POWER LEAD ASSEMBLIES FOR SOLID OXIDE FUEL CELL GENERATORS

(75) Inventors: Robert Draper, Pittsburgh, PA (US); Michael P. Jaszcar, Murrysville, PA (US); Arun Iyengar, Monroeville, PA (US); Niranjan Desai, Pittsburgh, PA (US); Charles R. Osborne, Pittsburgh, PA (US)

(73) Assignee: Siemens Energy, Inc., Orlando, FL (US)

( * ) Notice: Subject to any disclaimer, the term of this patent is extended or adjusted under 35 U.S.C. 154(b) by 928 days.

(21) Appl. No.: 10/915,514

(22) Filed: Aug. 10, 2004

(65) Prior Publication Data

US 2006/0035128 A1    Feb. 16, 2006

(51) Int. Cl.
*H01M 8/10* (2006.01)
*H01M 2/14* (2006.01)

(52) U.S. Cl. .............................. 429/32; 429/38; 429/31
(58) Field of Classification Search .................... 429/31
See application file for complete search history.

(56) References Cited

U.S. PATENT DOCUMENTS

| | | | |
|---|---|---|---|
| 3,727,171 A * | 4/1973 | Coles et al. ................. | 439/110 |
| 4,431,715 A | 2/1984 | Isenberg | |
| 4,490,444 A | 12/1984 | Isenberg | |
| 4,801,369 A | 1/1989 | Draper et al. | |
| 4,827,606 A * | 5/1989 | Szreders et al. ............... | 429/31 |
| 4,873,156 A * | 10/1989 | Satake et al. .................. | 429/31 |
| 4,874,678 A | 10/1989 | Reichner | |
| 4,888,254 A | 12/1989 | Reichner | |
| 6,001,501 A * | 12/1999 | Collie ......................... | 429/31 |
| 6,379,831 B1 | 4/2002 | Draper et al. | |
| 6,656,623 B2 | 12/2003 | Holmes et al. | |
| 6,692,264 B2 * | 2/2004 | Fuss ............................ | 439/66 |
| 2002/0110716 A1 * | 8/2002 | Holmes et al. ................ | 429/31 |
| 2003/0203263 A1 | 10/2003 | Brown et al. | |
| 2004/0106031 A1 * | 6/2004 | Sherman et al. ............... | 429/34 |

FOREIGN PATENT DOCUMENTS

WO    WO 02/067345 A2    8/2002

* cited by examiner

*Primary Examiner*—Dah-Wei D Yuan
*Assistant Examiner*—Edu E Enin-Okut (57) ABSTRACT

A solid oxide fuel cell generator (10) is made which contains bundles (14) of solid oxide fuel cells (36), a bus bar unit (128) in adjacent contact with the fuel cell bundles, where the bus bar unit (128) can pass electrical current, the bus bar unit (128) containing flat inner plate sections (130) adjacent the fuel cell bundles, outer solid nickel bar (134) and with solid, U-shaped nickel strap take-off connections (136) between the plates and bar; and a power lead (140) electrically connected to the outer solid nickel bar, where the flat inner plate sections (130) and solid U-shaped nickel strap take-off connections (136) pass electrical current generated in the fuel cell bundles through the bus bar units (128).

9 Claims, 7 Drawing Sheets

CURRENT BUS AND POWER LEAD ASSEMBLIES FOR SOLID OXIDE FUEL CELL GENERATORS

FIELD OF THE INVENTION

The invention relates to improved electrical bus connection structures for bringing electrical power out of exterior fuel cell bundles of a high temperature fuel cell generator. The invention is more particularly directed to passing electricity generated by high temperature solid electrolyte fuel cells which utilize an electrochemical combustion reaction between an oxidant and a fuel gas, which are combined at the fuel electrode to directly convert chemical energy of the fuel into direct current electrical energy. A typical such fuel cell reacts hydrogen and or carbon monoxide with the oxygen in air to produce electrical energy, water vapor and heat.

BACKGROUND OF THE INVENTION

Solid oxide electrolyte fuel cells operate at elevated temperatures of from about 700° C. to about 1100° C. in order to render the solid oxide electrolyte sufficiently conductive of negative oxygen ions to achieve high conversion efficiency, as taught, for example, in U.S. Pat. No. 4,490,444 (Isenberg). There, simple plates were illustrated as electrical connectors.

In the fuel cell generator described above, the electrical connection or contacting of output buses to the high temperature fuel cell electrodes is carried out in a high temperature zone within the generator with the output buses then being brought through the generator housing for interfacing with an electrical load line at near ambient temperature. The output electrical buses must be large area, high-conductivity conductors, which means that they are also excellent thermal heat sinks which conduct heat away from the fuel cell members with which they are in physical contact. This, however, could cause non-uniform fuel cell cooling, cold spots and unacceptable temperature gradients with potential cracking of some fuel cells in the bus bar fuel cell contact area.

Isenberg, in U.S. Pat. No. 4,431,715 attempted to solve these problems by providing an electrode bus which is spaced parallel to the output bus with a plurality of symmetrically spaced transversely extending conductors extending between the electrode bus and the output bus, with thermal insulation means provided about the transverse conductors between the spaced apart buses. Single or plural stages of the insulated transversely extending conductors can be provided within the high temperatures regions of the fuel cell generator to provide highly homogeneous temperature distribution over the contacting surfaces. As shown in FIG. 2 of that patent, in the plural stage connection, a second level of transversely extending conductors which are also symmetrically spaced apart but are lesser in number than the first stage transverse conductors with the second stage transverse conductors having a correspondingly greater conductor thickness or volume than the first stage transverse conductors. Thermal insulation is also provided about the second stage transverse conductors and fills the volume between the second bus and the output bus. This can tend to get complicated as the power output of the generator is increased.

A somewhat similar bus bar design utilizing power leads connected to parallel vertical bus bars separated by a series of flexible take-off connectors, is shown, in U.S. Pat. Nos. 4,801,369 and 6,656,623 B2 (Draper et al., and Holmes et al., respectively).

Solid Oxide Fuel Cell (SOFC) Generators that are constructed in such a way as not require a seal between the oxidant and fuel streams, presently use closed ended extruded cells of circular cylinder cross section. Cells of a flattened parallel sided cross section that have a number of ribs connecting the adjacent parallel sides with a plurality of air electrode holes therethrough, of the extrusion such as those taught, for example in U.S. Pat. Nos. 4,888,254 and 4,874,678 (both Reichner et al.), are very promising and will achieve a higher power density. In both of these cell types the extrudant is the Lanthanum Manganate air electrode (cathode) material. After firing at 1500° C. this forms the structural basis of the cell upon which the electrical interconnection strip(s) and the electrolyte are deposited in an overlapping manner in order to prevent air outleakage during operation. The fuel electrode (anode) is subsequently deposited over most of the electrolyte leaving a narrow margin around the interconnection strip in order to avoid electrical shorting.

Air is carried within the cells while the external surface is exposed to fuel gas. Cells are series connected by means of nickel connectors which join the nickel plated interconnection strip (that is bonded contact with the air electrode) of one cell with the fuel electrode of the adjacent cell. Present practice utilizes connectors that are of nickel screen and nickel foam construction.

When circular cylindrical cells are used in the screen design, such as that taught by Draper et al. in U.S. Pat. No. 6,379,831 B1, it is such that it facilitates parallel electrical connection of series connected strings of cells. For ease of generator fabrication cells are connected by means of a nickel powder filled epoxy. The bundle is then heated to 1000° C. while being subjected to an externally applied load. The effect is to burn off the organic agents in the epoxy while the nickel powder forms sinter bonds between cells, and the nickel screen/foam connections.

Circular cylindrical cells are formed into bundles that are usually three cells wide and eight cells deep in the direction of current flow. Higher power density (HPD) flat cells will be formed into bundles having between ten and twenty cells in series. Bundles are connected by further welding of screens to form a row. Rows are connected by further welding of screens to form a generator module.

Current flow is in a direction normal to the lengthwise axis of the cells. Vertical bus bars are connected to the cathode end of the first bundle in a generator module and to the anode end of the last bundle. The bus assemblies serve to distribute current to the stack and to collect current from the stack.

Bus bars are approximately equal in width to the cell bundle and equal in length to the electrochemically active portion of the bundle. The elements of the bus bar which make a welded connection to the cell bundle are a plurality of nickel pads. These pads are formed from nickel felt which is faced with a thin nickel weld plate. The pads are distributed along the length of the bus bar with a very small gap between adjacent pads. The nickel pads are sinter bonded to components of the bus bar which are designated as the "power take-offs". Three power take-offs are placed end to end along the length of the bus bars.

The construction of the power take-off units is that of a fiberous alumina block which is sandwiched between nickel plates. Ninety six wires are positioned on an 8×12 array behind every nickel pad. This ultimately results in up to 3800 nickel and nickel wires/pins connected to an end plate where the nickel wires/pins are perpendicular to and welds per three power take-off units.

The three power take-off units are sinter bonded to a continuous nickel felt that runs the entire length of the assembly. The opposite side of this felt is sintered to a continuous nickel bar that also runs the entire length of the assembly, to provide the bus bar assembly. A power lead is welded to the center of the bus bar assembly.

This complex structure which constitutes the bus bar has three key positive aspects of functionality. These are: high electrical conductance, good thermal insulating characteristics in order to prevent chilling of the SOFC bundle to which the bus bar is connected, and mechanical compliance which accommodates different thermal expansion rates of the connected components.

However, a serious problem with the design stems from its complexity. Fabrication of the bus bar is very labor intensive. The total parts count is as high as 1990. As a consequence, the manufacturing cost is very high. What is needed is a much simpler design that is much less costly to construct yet maintains the key attributes that are cited above. It is one of the main objects of this invention to provide a much simpler, much less time consuming, lower cost bus bar construction which is still as effective as current bus bar design.

SUMMARY OF THE INVENTION

The above needs are met and objects accomplished by providing a solid oxide fuel cell generator comprising: (a) a plurality of bundles of solid oxide fuel cells which can be contacted by feed fuel and feed oxidant through fuel and oxidant entrances, the fuel cells, capable of generating electrical current, having a solid oxide electrolyte separating a fuel electrode and an oxidant electrode; (b) a bus bar unit in adjacent contact with the plurality of fuel cell bundles at the sides of the generator where the bus bar unit can pass electrical current from the adjacent fuel cell bundles the bus bar unit consisting essentially of inner flat screen or plate (hereinafter "plate"), sections near the fuel cell bundles, outer solid nickel bar, and with wide, solid, corrugated flexible nickel strap electric current take-off connections having at least one U-shaped strap therebetween, (c) a power lead electrically connected to the outer solid nickel bar, and also electrically through the bus bar unit to the fuel cell bundles through the take-off connection and inner plate sections; where the inner plate sections and take-off connections pass electrical current generated in the fuel cell bundles. The electrical current can be passed through the bus bar unit to an electricity generating source or receiving sink.

The bus bar unit of plate sections, solid nickel bar, with wide, solid flexible U-shaped nickel strap is utilized as a firm yet flexible unit for passing current from adjacent fuel cell bundles.

Figure 11:
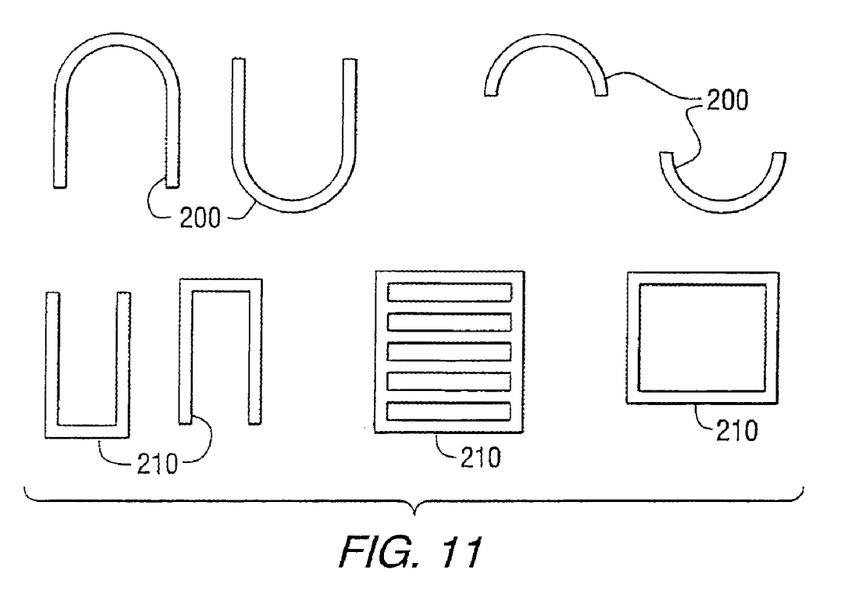
FIG. 11 is a cross-sectional view of examples of acceptable strap connections and non-acceptable strap connections.

The power lead is electrically connected to the fuel cell bundles through corrugated U-shaped strap take-off connectors, which can be connected to the inner plate sections, preferably by spot welding in a wide variety of fashions. The strap is preferably a regular or inverted U-shaped/corrugated, with a rounded surface, preferably top surface and parallel sides, as in a inverted U to promote controlled flexibility. The strap can also be a regular U-shape or semicircle C bottom or top up as shown in FIG. 11 as straps 200.

This U-shape is similar to a flattened, flexible horseshoe shape to provide a ridge (top or bottom of the U) and connecting to generally parallel inner sides, which are preferably filled with compliant insulation. This design prevents by-pass gas flow and eliminates 70%-90% of the detailed, expensive, precise, welding previously required. The strap is from about 7.5 cm to 10 cm wide (3 inch to 4 inch) and 0.5 cm to 0.1 cm thick (0.02 inch to 0.04 inch).

Within these parameters, after spot welding to adjacent components a firm yet flexible U strap power take-off unit results which is extremely low cost, simple, easily welded and eliminates the entire complex wire/pin take-off units previously thought essential. Electrical conduction resulting, while circuitous is at least 80% as effective as the previous construction while costing about ¼ the cost in terms of parts, assembly time and welding. This is a dramatic result, to gain 75% in costs and lose only 20% effectiveness.

The bus bar/power lead assembly of this disclosure is applicable to SOFC Generators of all sizes and can be used with conventional circular cylindrical cells and with high power density flat cells. Significant and novel attributes of the design are as follows: The design disclosed here has a parts count that is almost two orders of magnitude less than that of the design previously used in SOFC generators. The number of spot welds that must be make is reduced by more than an order of magnitude compared to current practice. Also, a sintering step has been eliminated.

Several variations on a basic concept in which fuel cell bundles are connected to the bus bar through a multiplicity of flexible current carrying straps are described here. All of these permit an increased degree of relative motion between the cell stack and the bus bar assembly compared to present practice.

BRIEF DESCRIPTION OF THE DRAWINGS

The above and other advantages of this invention will be more apparent from the following description in view of the drawings, where.

DESCRIPTION OF THE PREFERRED EMBODIMENT

In order to better understand the preferred embodiments of this invention, it is advantageous to regress and discuss some similarities and dissimilarities vs. previous designs. Referring now to prior art FIG. 1, a side section of a solid oxide fuel cell generator 10 is shown. It contains a plurality of fuel cell stacks of fuel cells 36. Each fuel cell, in this embodiment, is in hollow, axially elongated form, preferably tubular as shown, having an open top end 37 and, as shown in this embodiment, a closed bottom end 38. Use of dual open ended fuel cells is also an option. The fuel cells contain interior self supporting air electrodes, usually of a nickel zirconia cermet, with solid electrolyte, usually comprising yttria stabilized zirconia, there between, as is well known in the art. The fuel cells operate on a feed oxidant 50, usually pre-heated air, and reformed fuel 12, usually internally or externally reformed to provide $H_2$+CO anode gas, shown at the bottom of FIG. 1. The fuel passes from a bottom fuel inlet plenum, through fuel entry boards having holes there through, at the bottom of the fuel cell generator, to contact the exterior of the fuel cells 36. An oxidant inlet plenum 52 can be formed by Enclosing insulation is shown as 76, 76'; and 76".

Figure 1:
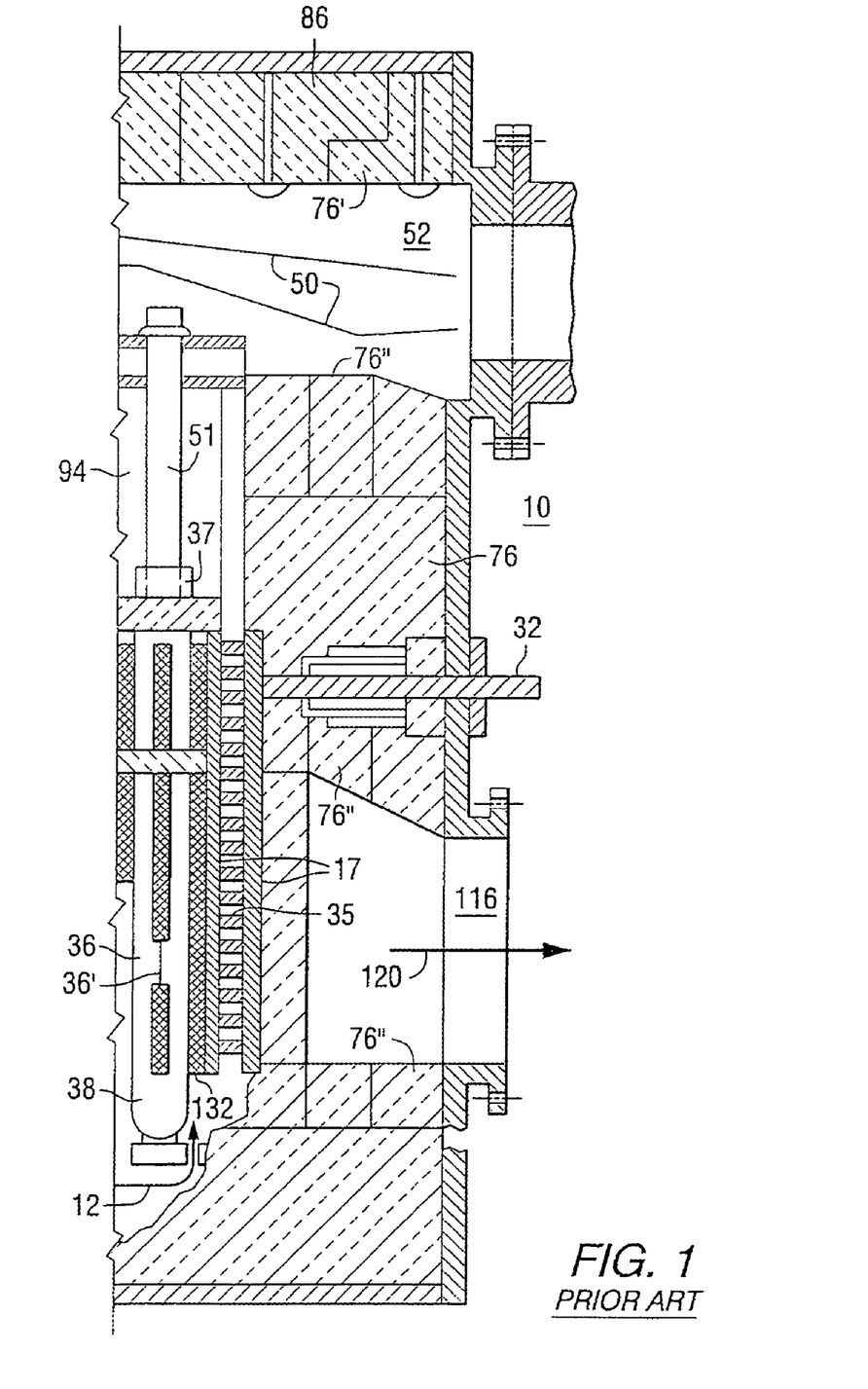
FIG. 1 is a side view, in section, of part of a solid oxide fuel cell generator showing prior art oxidant inlet plenum, exhaust outlet and bus bar/power take-off connector design attached to a fuel cell of a fuel cell bundle.

In operation, oxidant 50, entering oxidant inlet plenum 52, flows down oxidant feed tubes 51 into the open top end 37 of fuel cells 36, to the bottom 38 of the fuel cells where it reverse flows, contacting the inner air electrode, reacts to provide depleted oxidant which exits the open top end 37 of the fuel cells into oxidant/fuel exhaust combustion chamber 94. The reformed fuel 12 passes outside of the fuel cells 36, where it reacts to form spent fuel, part of which exits to the combustion chamber 94 to combust with depleted oxidant to help heat oxidant.

Insulation 76, 76'; and 76", most of it in bulk form, about 70% porous by volume, surrounds all these components which are enclosed by a metallic, usually, steel canister, providing the pressure boundary of the system. Exhaust outlet is shown as 116, with exhaust flow shown as 120. Top cover insulation is shown as 86.

Power leads 32 are shown, for the sake of simplicity, on the side where oxidant inlet plenum 52 and exhaust outlet 116 are located. They are, however, each electrically connected to parallel bus bars 17 and to the fuel cells 36, through power take-off connectors 35, which contact fuel cells via weld plates which are themselves joined to the nickel foam/screen cell connector. The power leads 32 are transverse to the axis 36' of the fuel cells and fuel cell bundles and are embedded in insulation material. This is the design of the Holmes et al. U.S. Pat. No. 6,656,623 B2, filed in February 2001.

Figure 2:
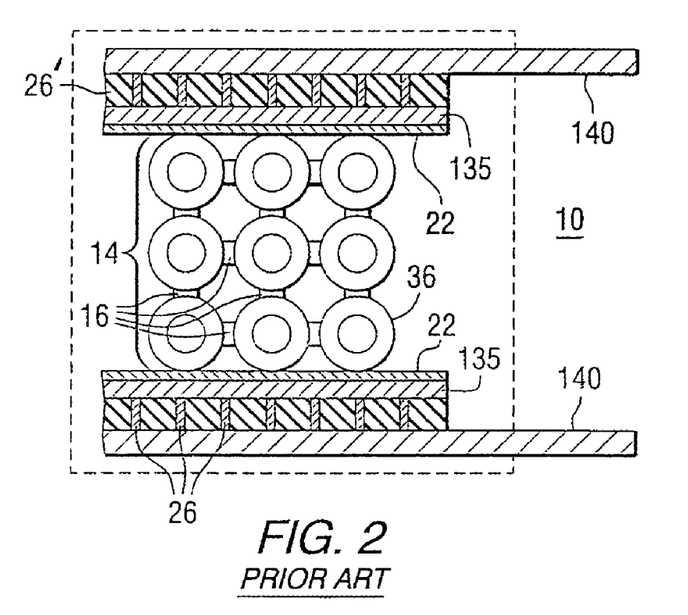
FIG. 2 is a top cross-sectional view of a prior art bus bar to fuel cell bundle assembly.

Prior art FIG. 2 illustrates the prior art fuel cell bundle to bus bar assembly of Isenberg, U.S. Pat. No. 4,431,715. There a fuel cell generator 10, containing fuel cell bundle 14, has fuel cells 36 connected by metallic pads 16. Power leads 140 extend from opposed sides of the stack. Large area electrically conductive pads 22 are disposed in intimate electrical contact with exterior fuel cells of bundle 14 as shown and are also connected to a large area nickel bar 135. Transversely extending conductive members 26 pass through insulation 26' to power leads 140 providing a multiplicity of parallel conductive members 26 contacting power leads 140. This has been a continuing basic design for the last twenty years and its complexity has reached the point shown, for example, in FIG. 3.

One type of wire/pin contact construction is shown in FIG. 2. Power take-off connectors/units 35 are still generally as shown in FIG. 1 but now much more complicated and are at a 90° angle to the bus bar (not shown in FIG. 3) which would be disposed on the other side of continuous nickel plate 122, with, usually, a nickel felt between the bus bar and nickel plate. The construction of the power take-off connectors/units 35 involves penetration of a fiberous alumina block 124 which is sandwiched between continuous nickel plates 122.

Figure 3:
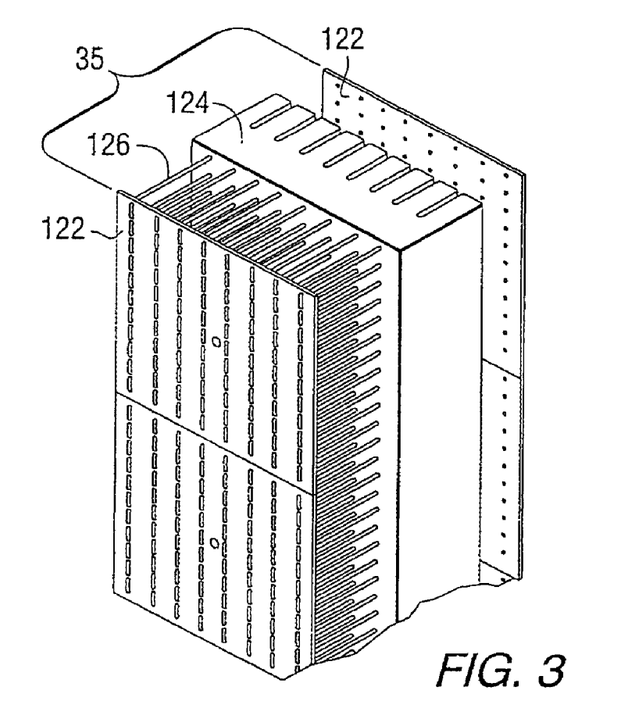
FIG. 3 is an exploded three dimensional view in part, of one type of power take-off connector design based on nickel wire/pin contact viewed from the left side.

Nickel wires or pins 126 penetrate the block 124 and are spot welded on each side to the plates 122. Wires are positioned on an 8×12 array. Two shorter (outer) power take-offs each have 480 wires while the longer center power take-off has 960 wires for a total 1920 wires and 3840 welds. Three power take-off units (only one is shown here) are sinter bonded to a continuous nickel felt (not shown) that runs the entire length of the assembly. The opposite side of this felt is sintered to a continuous nickel bus bar that also runs the entire length of the assembly. A power lead is welded to the center of the bus bar. This constitutes the "pin design" power take-off units with pins perpendicular to the bus bar providing design rigidity with little or no spring/flexibility.

Figure 4:
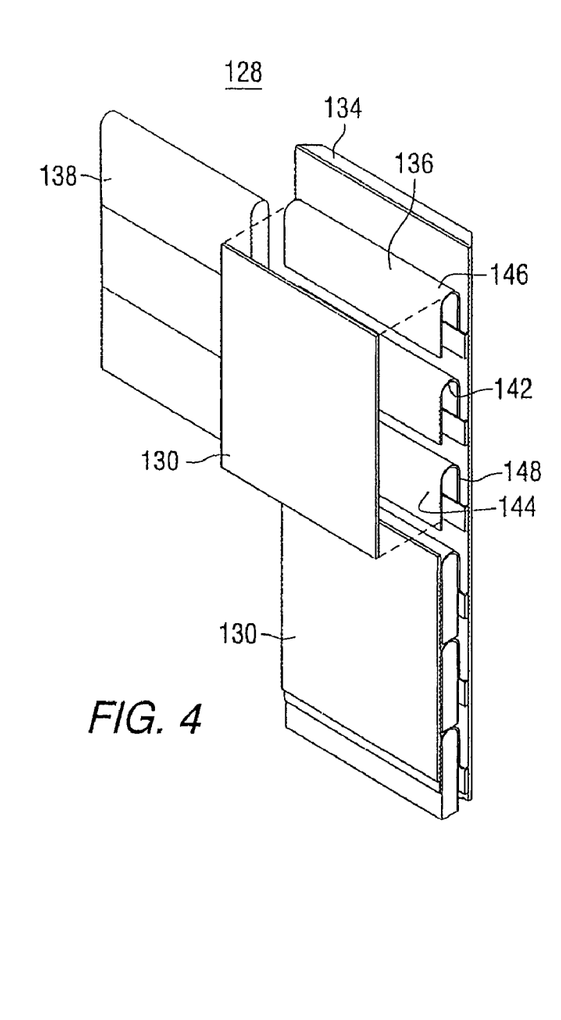
FIG. 4 shows one embodiment of the bus bar assembly of this invention in a three dimensional view from a left side view showing the screen/plate section.
Figure 5:
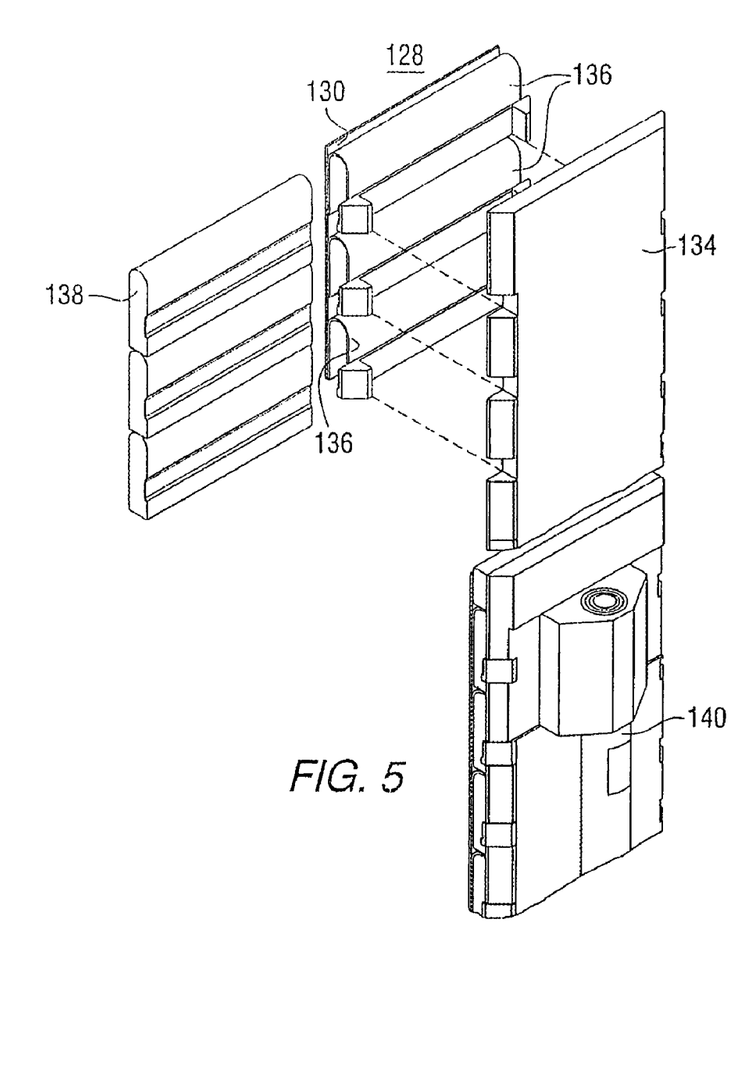
FIG. 5, which best illustrates this invention, shows one embodiment of the bus bar assembly of this invention in a three dimensional view from a right hand view showing the bus bar assembly.

The bus bar configuration which is an important part of this invention, is best illustrated by FIGS. 4 and 5. Typically the outer screen of an SOFC bundle for the standard product is divided into four sections which together cover the active length of the bundle. A small gap exists be neighboring screen sections. The bus bar unit 128 of FIGS. 4 and 5 has adjacent matching flat inner plate sections 130 which ultimately become edge welded to the screen section 132 of the fuel cell bundle shown in FIG. 1. A solid outer nickel bar 134 of the bus bar assembly of FIGS. 4 and 5 connects to each of the flat inner plate sections 130 by means of thin (typically 0.5 mm (0.2 in)) wide (typically 10 cm (4 in)) solid U-shaped nickel strap take-off connections 136. This bus bar unit, comprising flat inner plate 130, outer solid nickel bar 134, with solid U-shaped nickel strap take-off connections 136 therebetween is utilized as a unit for passing electrical current from adjacent fuel cell bundles (not shown). A power lead 140 is electrically connected to the outer solid nickel bar, and also to the fuel cell bundles through the solid U-shaped nickel strap take-off connections 136 and flat inner plate sections 130.

The solid U shaped nickel strap take-off connections 136 are "corrugated" and "U-shaped", herein defined as having at least one rounded top or bottom surface 142, as shown, to promote flexibility. In all of the FIGS., the "corrugated" strap is shown as an inverted U, but it can also be a standard U or inverted or regular semicircle, all as shown as, for example, 200 in FIG. 11, a true horseshoe or semicircle shape disposed regularly or inverted as shown in FIG. 2 as 200.

In a recently constructed experimental generator, five straps were used on each of four screen sections. This arrangement gave good electrical conductance. For the full length bundles, up to nine straps can be used on each of four screen sections. The fact that the straps are solid prevents the streaming of fuel gas in the gap which separates the screen sections and the solid nickel bar 134. As a further measure against the unwanted by-pass of fuel gas, the space between straps inner, and outer surfaces is preferably packed with insulation 138, preferably high purity alumina.

FIG. 5 shows a center connected power lead 140 that passes out of the generator at the bottom, rather than the side. Thus the fuel cell bundles connect in electrically conducting relationship to metal plates which are electronically contacted to the power lead by solid "U-shaped" nickel strap take-off connections 136, preferably having an inverted U-shape, (but U's as opposed to inverted U would also work as shown in FIG. 11) with a rounded top or bottom surface 142 and a flat inner plate contact side surface 144 parallel to the fuel cell bundles and flat inner plate sections 130, eliminating the pin/wire connectors of the take-off unit. The inverted U configuration results in a slightly shorter power lead connection with the standard U configuration. FIG. 11 illustrates acceptable "corrugated" straps 200 and non-accepted straps 210.

Figure 6:
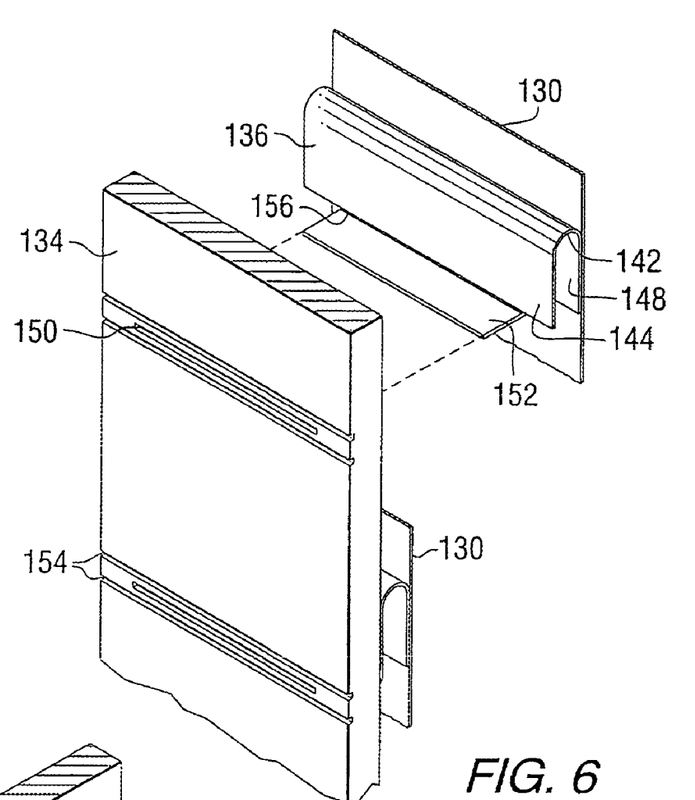
FIG. 6, is an exploded three dimensional view, in part of one type of U strap connection to the bus bar unit.

The term "corrugated" or "U-shaped" as used herein means shaped to provide ridges 146 on top of and grooves beneath the rounded top or bottom surface 142 of the strap as shown in FIG. 4. FIG. 6 also clearly illustrates these solid U-shaped nickel strap take-off connections 136, each having parallel flat inner plate contact side surfaces 144 and 148 and rounded top or bottom surface 142 to form an inverted U-shaped spring/strap which is attached to a nickel bar 134 and a flat inner plate section 130, with insulation 138 contained within the U of the spring/strap, providing a tough, yet flexible design.

Figure 7:
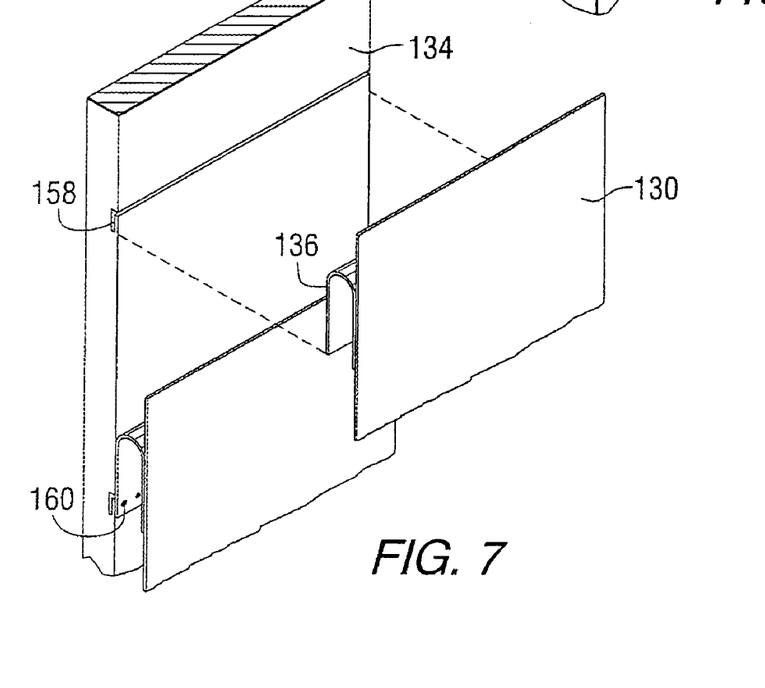
FIG. 7, is an exploded three dimensional view, in part of another type of U strap connection to the bus bar unit.

Attachment of the solid U-shaped nickel strap take-off connections 136 to the flat inner plate sections 130 (weld plates) is by means of spot welding. Four means of attachment of the straps to the outer solid nickel bar 134 are shown by FIGS. 5, 6, 7 and 8. FIG. 6 illustrates one type of methodology. In this approach, narrow horizontal slots 150, which can be about half the width of the outer solid nickel bars 134 are cut in the outer solid nickel bar 134 at all of the strap locations. A horizontal tongue 152 at the bottom end strap edge 156 of inverted U-shaped strap is passed through the slot and is welded to the bar along a line where it projects through the bar. These slots help effect the weld at strap-nickel bar contact points. Optionally shallow grooves 154 can be cut in the bar on both sides of the slot. These improve the weld characteristics by eliminating large differences in the masses of joined parts at the weld location. FIG. 7 illustrates an alternative methodology which permits joining of the solid U-shaped nickel strap take-off connections 136 to the outer solid nickel bar 134 by spot welding. This approach has virtually no negative impact on the electrical conductance of the bus bar. "L" shaped, horizontal slots or grooves 158 are cut in the bar at all strap locations using a wire EDM machining technique. The flat face of the strap is placed against the thin section of the base which is formed by the "L" shaped slot and the two are spot welded together as at point 160.

Figures 8, 9:
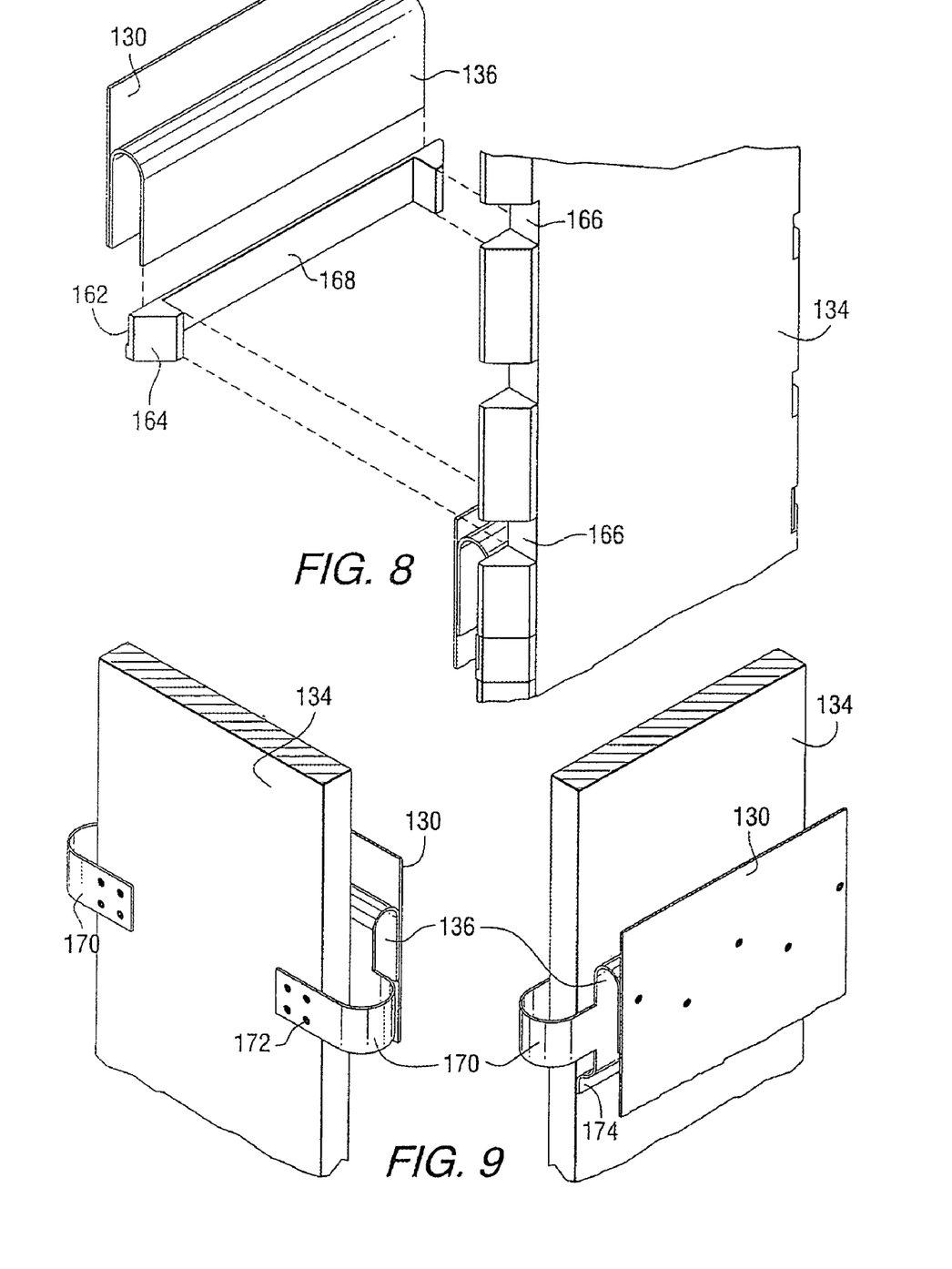
FIG. 8, is an exploded three dimensional view, in part of a third type of U strap connection to the bus bar unit; also shown in FIG. 5.
FIG. 9 is an exploded three dimensional view, in part of a fourth type of double reversed U strap connection to the bus bar unit.

FIG. 8 illustrates another methodology as also shown in FIG. 5. In this adaptation, each solid U-shaped nickel strap take-off connection 136 is attached to a bus bar mount 168 such as entering a cut/channel 162 in the bus bar mount 168. Protruding tongues 164 on the ends of the bus bar mounts 168 enter/mate with side slots 166 on the outer solid nickel bar 134 and are welded to the outer solid nickel bar 134. FIG. 9 illustrates a strap that is formed from a single piece which has a plurality of U-shaped straps—here three, the normal solid U-shaped nickel strap take-off connection 136 has additional horizontal side strap loops 170 as shown. This, while a bit complicated, provides flexibility in all directions. The solid U-shaped nickel strap take-off connections 136 allow differential motion between the outer solid nickel bar 134 and cell bundle (not shown) in the vertical direction whereas loops 170 allow for lateral displacement. Together they allow the distance between cell bundle and nickel bar to change without the introduction of substantial reaction force.

Figure 10:
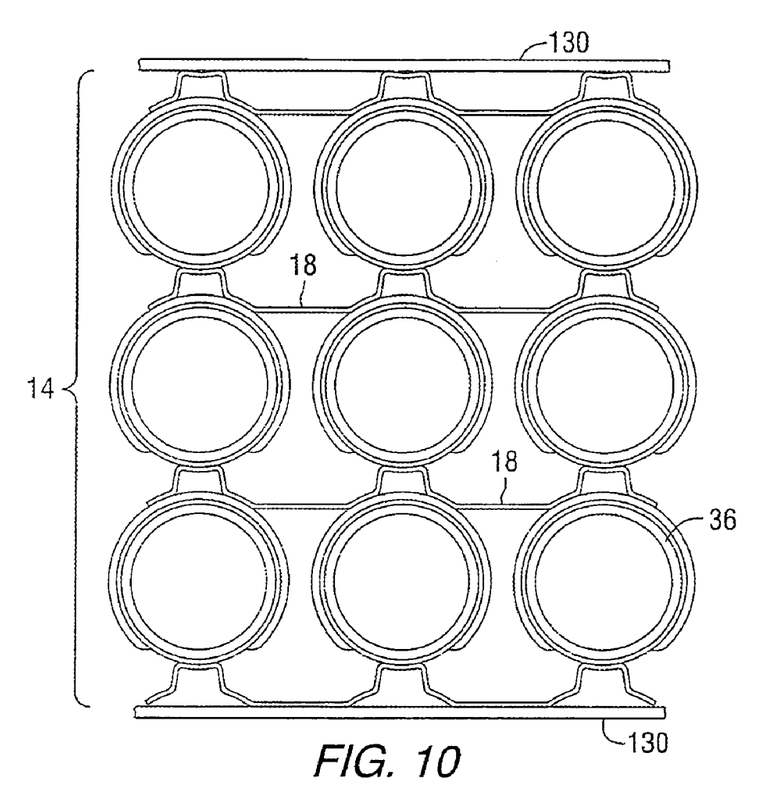
FIG. 10 is a cross-sectional view of U screen; connections to fuel cells in a bundle, and attachment of the bundle to matching screen sections which are to be attached to a U-shaped, flexible, corrugated strap take-off connector.

The ends of loops are spot welded at points 172 to the nickel bar. A tab 174 rests against the bar but has no firm connection to the bar. The function of this tab is to prevent streaming of the fuel adjacent to the face of the bar. Thus, as shown in FIG. 10, which is one general embodiment of a connection design (eliminating detailed connections to plate 130, shown in FIG. 12) showing mesh screen 18 connecting each row of fuel cells 36 in fuel cell bundle 14, similarly to U.S. Pat. No. 6,379,831 B1, all connected to plate screen sections 130 after which straps (not shown) can be attached, for example, as shown in FIGS. 4-9.

Figure 12:
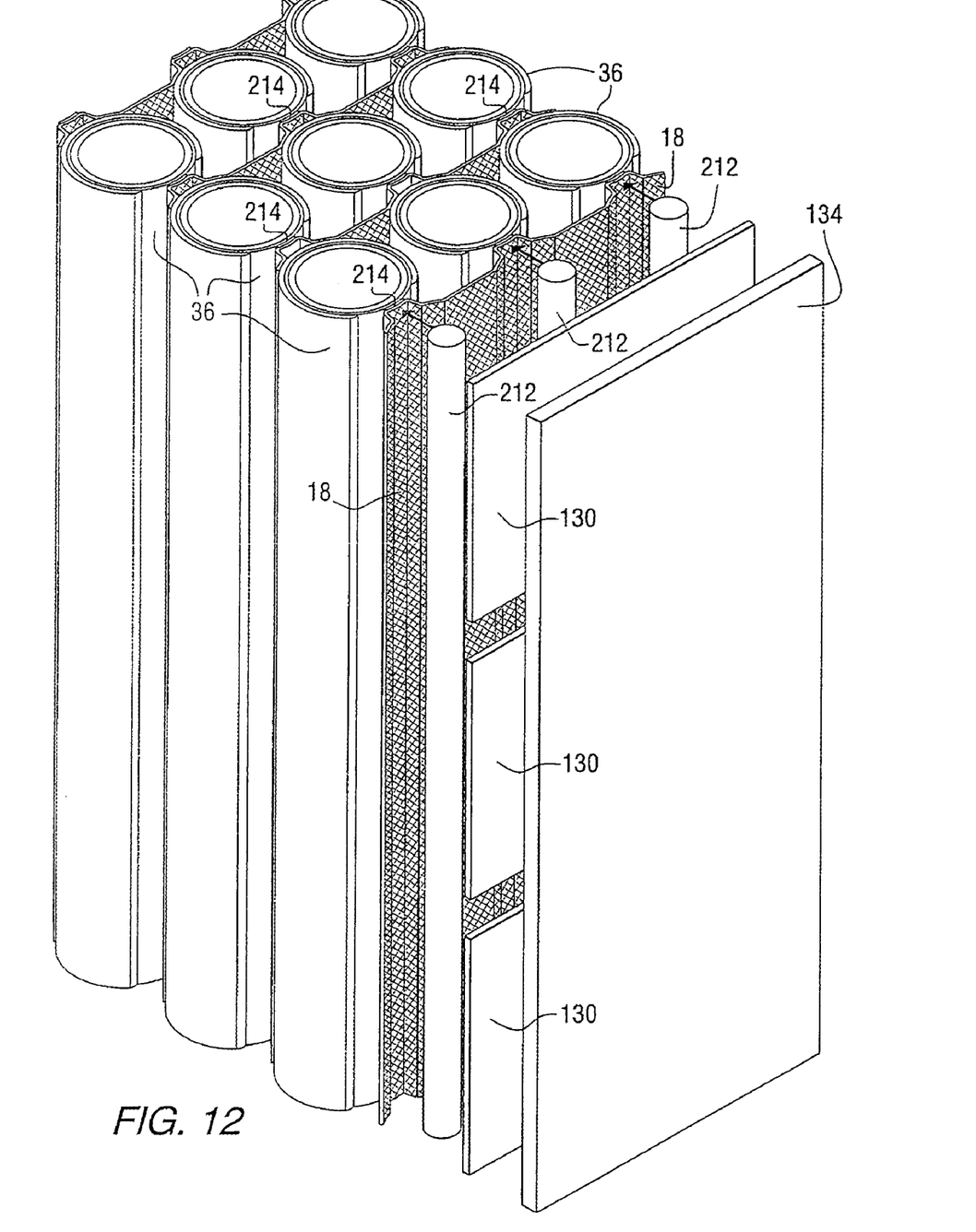
FIG. 12 is a simplified, exploded, three dimensional view showing the relationship of the fuel cells to mesh connector screens and nickel plates.

FIG. 12 is a simplified, exploded view showing the relationship of the fuel cells 36, shown simply as tubes for the sake of simplicity to connector mesh screens 18. As shown, nickel foam strip tops 214 are disposed between the sides of fuel cells 36 and the connector mesh screens 18 that contact the flat inner plate sections 130 and nickel foam filler strips 212 are disposed between the connector mesh screens 18 and flat inner plate sections 130. Spaced apart, without showing the U-shaped straps (for the sake of simplicity), is the outer solid nickel bar 134. As shown metal foam filler strips 212 fill indentations in the connector mesh screen 18, and the flat inner plate sections 130 are attached/welded to contacting connector mesh screen 18.

The role of the power lead, 140 in FIG. 5 is to provide the electrically conductive path between the external electrical circuit and the outer solid nickel bars 134 that distribute current to, or collect current from, the SOFC stack. Attributes that the power lead must possess include the following:

High electrical conductivity.

Tolerance of temperatures in the region of 900° C.

Tolerance of a reducing atmosphere at the point of connection to the bus bar the power lead is exposed to the reformed fuel gas atmosphere at 900° C.

Geometric configuration that facilitates an effective gas seal at the point where the power lead passes from the reformed fuel atmosphere to the atmosphere which surrounds the stack.

Tolerance of an oxidizing atmosphere. Depending upon the design of the generator the atmosphere surrounding the stack in the region of the power lead pass-through might be the generator exhaust stream or the air feed stream. In any event the atmosphere is oxidizing and the temperature might be in the region of 500° C.

These requirements result in the following power lead features:

Nickel should be used in the high temperature region between the point of contact with the bus and the point where the power lead passes through the gas seal.

Copper can be used in the lower temperature region outside of the generator atmosphere (on the oxidizing atmosphere side of the seal).

A circular cylindrical rod is preferred.

The relative merits of three possible schemes for position of connection of power lead 140 to nickel bar 134 (bus bar) have been examined from the following viewpoints. The effect on stack natural current distribution (no effect is ideal), and power loss. The "position of connection" schemes are as follows: (1) power leads connects to midpoint of bus on both positive and negative buses, which has always been considered best practice. (2) power leads connects to bottom of bus on both positive and negative bus, the most mechanically convenient, and (3) power leads connects to one end of the positive bus and to the opposite end of the negative bus.

It was found that, as a bus bar of fixed width is made thicker, the path resistance at all elevations is lowered and the perturbing effect of poor power lead position is lessened. As straps of constant width are made thinner their contribution to the strap/bus bar assembly resistance is increased, and as the numbers of cells in series is increased, the effect upon current distribution due to resistance within the stack becomes more dominant. Consequently, the effect of poor lead position is lessened. Accordingly, the issue of power lead position is more critical for small stacks, such as would be associated with residential units, than for large stacks.

Results indicated that the center or near center power take-off option gives the least perturbation of the natural current distribution in all cases and is therefore advantageous, and that the advantage of center power take-off diminishes quickly with increase of number of cells in series.

It is possible to achieve a distribution of the straps 136 along the bus bar which preserves the natural current density distribution of the stack. This is close to being accomplished when axial concentration of the straps is proportional to the axial current distribution of the stack.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalent thereof.

What is claimed is:

1. A solid oxide fuel cell generator comprising:
   (a) a plurality of bundles of solid oxide fuel cells, having a hollow, axially elongated form, which can be contacted by feed fuel and feed oxidant through fuel and oxidant entrances, the fuel cells, capable of generating electrical current, having a solid oxide electrolyte separating a fuel electrode and an oxidant electrode;
   (b) a bus bar unit in adjacent contact with the plurality of fuel cell bundles at the sides of the generator where the bus bar unit can pass electrical current from the adjacent fuel cell bundles, the bus bar unit consisting essentially of flat inner plate sections adjacent the fuel cell bundles, and an outer solid nickel bar, with solid, nickel strap take-off connections therebetween, where the nickel strap take-off connections are flexible, having a thickness of about 0.05 cm. to 0.1 cm., have a rounded top or bottom surface, and have a shape selected from the group consisting of a U-shape, an inverted U-shape, a semi-circle, and an inverted semicircle, and where the outer solid nickel bar has slots in its walls at contact points with the nickel strap take-off connections to better effect welding of the nickel strap take-off connections to the outer solid nickel bar;
   (c) connector mesh screens electrically connecting the fuel cells together where at the contact of adjacent bus bar units, the flat inner plate sections are edge welded to the connector mesh screens, where the connector mesh screens have tops contacting the sides of the fuel cells and vertical metal foam filler strips are disposed between the screen tops contacting the fuel cells and the flat inner plate sections; and
   (d) a power lead electrically connected to the outer solid nickel bar, and also electrically through the bus bar unit to the fuel cell bundles through the nickel strap take-off connections and flat inner plate sections; where the flat inner plate sections and nickel strap take-off connections pass electrical current generated in the fuel cell bundles, and where the power lead passes out of the generator at the bottom of the generator.

2. The solid oxide fuel cell generator of claim 1, wherein the nickel strap take-off connections have a shape selected from a U-shape and an inverted U-shape, where in both shapes the rounded top or bottom surface connects to parallel sides.

3. The solid oxide fuel cell generator of claim 2, wherein the nickel strap take-off connections are an inverted U-shape, and where the interior of the nickel strap take-off connections is filled with insulation.

4. The solid oxide fuel cell generator of claim 2, wherein the nickel strap take off connection is from about 7.5 cm to 10 cm wide.

5. The solid oxide fuel cell generator of claim 1, wherein the nickel strap take-off connections have a shape selected from the group consisting of a U-shape, and an inverted U-shape the fuel cell bundles comprise a plurality of electrically connected fuel cells, each having a solid oxide electrolyte with an inner air electrode and an outer fuel electrode, and the fuel cell bundles are attached to the flat inner plate sections.

6. The solid oxide fuel cell generator of claim 5, wherein the fuel cells are tubular fuel cells having an open end and a closed bottom end.

7. The solid oxide fuel cell generator of claim 5, wherein the fuel cells have a flattened parallel sided cross-section with a plurality of air electrode therethrough.

8. The solid oxide fuel cell generator of claim 1, wherein the nickel strap take-off connections are welded to the flat inner plate sections.

9. The solid oxide fuel cell generator of claim 1, wherein the nickel strap take-off connections are welded to the outer solid nickel bar.

* * * * *

UNITED STATES PATENT AND TRADEMARK OFFICE
CERTIFICATE OF CORRECTION

PATENT NO. : 7,651,801 B2 Page 1 of 1
APPLICATION NO. : 10/915514
DATED : January 26, 2010
INVENTOR(S) : Draper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1199 days.

Signed and Sealed this

Twenty-third Day of November, 2010

David J. Kappos
*Director of the United States Patent and Trademark Office*